(12) United States Patent
Ko

(10) Patent No.: US 11,899,177 B2
(45) Date of Patent: *Feb. 13, 2024

(54) OPTICAL IMAGING SYSTEM

(71) Applicant: SAMSUNG ELECTRO-MECHANICS CO., LTD., Suwon-si (KR)

(72) Inventor: Jung Hui Ko, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 88 days.

This patent is subject to a terminal disclaimer.

(21) Appl. No.: 17/190,752

(22) Filed: Mar. 3, 2021

(65) Prior Publication Data

US 2021/0191090 A1 Jun. 24, 2021

Related U.S. Application Data

(63) Continuation of application No. 16/527,361, filed on Jul. 31, 2019, now Pat. No. 10,976,525, which is a continuation of application No. 15/498,926, filed on Apr. 27, 2017, now Pat. No. 10,823,939.

(30) Foreign Application Priority Data

Dec. 23, 2016 (KR) .................. 10-2016-0177430

(51) Int. Cl.
*G02B 13/00* (2006.01)
*G02B 9/60* (2006.01)

(52) U.S. Cl.
CPC .......... *G02B 13/0045* (2013.01); *G02B 9/60* (2013.01)

(58) Field of Classification Search
CPC .............................. G02B 13/0045; G02B 9/60
See application file for complete search history.

(56) References Cited

U.S. PATENT DOCUMENTS

| 4,673,259 A | 6/1987 | Kawamura |
| 5,805,348 A | 9/1998 | Estelle et al. |
| 2007/0206296 A1 | 9/2007 | Itoh et al. |
| 2012/0087019 A1 | 4/2012 | Tang et al. |
| 2012/0092778 A1* | 4/2012 | Tsai ................... G02B 13/0045 359/714 |

(Continued)

FOREIGN PATENT DOCUMENTS

| CN | 1764959 A | 4/2006 |
| CN | 204129426 U | 1/2015 |

(Continued)

OTHER PUBLICATIONS

Translation of JP-5298682 (2013).*

(Continued)

*Primary Examiner* — Alicia M Harrington
(74) *Attorney, Agent, or Firm* — NSIP Law

(57) ABSTRACT

An optical imaging system includes a first lens having a positive refractive power, a second lens having a negative refractive power, a third lens having a negative refractive power, a fourth lens having a negative refractive power, and a fifth lens having a positive refractive power. The first to fifth lenses are sequentially disposed from an object side to an imaging plane. One or more lenses among the first to fifth lenses are formed using a glass material.

20 Claims, 7 Drawing Sheets

(56) References Cited

U.S. PATENT DOCUMENTS

| | | | | |
|---|---|---|---|---|
| 2012/0314302 A1* | 12/2012 | Tang | ............... | G02B 13/22 |
| | | | | 359/714 |
| 2014/0043695 A1* | 2/2014 | Hsu | ............... | G02B 9/62 |
| | | | | 359/713 |
| 2014/0300975 A1 | 10/2014 | Tsai et al. | | |
| 2015/0029601 A1 | 1/2015 | Dror et al. | | |
| 2015/0077722 A1 | 3/2015 | Baba et al. | | |
| 2015/0116569 A1 | 4/2015 | Mercado | | |
| 2015/0185445 A1 | 7/2015 | Ahn et al. | | |
| 2016/0274333 A1 | 9/2016 | Tang et al. | | |
| 2016/0320589 A1* | 11/2016 | Liao | ............... | G02B 9/60 |
| 2017/0059828 A1 | 3/2017 | Sekine et al. | | |
| 2017/0146777 A1 | 5/2017 | Dror et al. | | |
| 2017/0199349 A1 | 7/2017 | Hsu et al. | | |
| 2017/0329105 A1 | 11/2017 | Lee et al. | | |
| 2020/0103631 A1* | 4/2020 | Hsu | ............... | G02B 27/0025 |

FOREIGN PATENT DOCUMENTS

| | | | | |
|---|---|---|---|---|
| CN | 104597586 A | 5/2015 | | |
| CN | 104849839 A | 8/2015 | | |
| CN | 105259636 A | 1/2016 | | |
| CN | 105607232 A | 5/2016 | | |
| CN | 206532023 U | 9/2017 | | |
| GB | 2 414 813 A | 12/2005 | | |
| JP | 60-198512 A | 10/1985 | | |
| JP | 2007-240653 A | 9/2007 | | |
| JP | 2009-294527 A | 12/2009 | | |
| JP | 5298682 B2 * | 9/2013 | ......... | G02B 13/0045 |
| KR | 10-2011-0072395 A | 6/2011 | | |
| KR | 10-2016-0016931 A | 2/2016 | | |
| KR | 10-2016-0075646 A | 6/2016 | | |
| WO | WO 2015/065730 A1 | 5/2015 | | |

OTHER PUBLICATIONS

Chinese Office Action dated Mar. 9, 2022, in counterpart Chinese Patent Application No. 202011428679.6. (9 pages in English and 7 pages in Chinese).

Chinese Office Action dated Dec. 18, 2017 in counterpart Chinese Utility Model Application No. 201720804307.6 (5 pages in English, 3 pages in Chinese).

Chinese Office Action dated Nov. 20, 2019 in counterpart Chinese Patent Application No. 201710541729.3 (17 pages in English, 11 pages in Chinese).

Korean Office Action dated Apr. 19, 2018 in counterpart Korean Application No. 10-2016-0177430 (10 pages in English, 6 pages in Korean).

Korean Dismissal for Amendment issued on Apr. 11, 2019 in counterpart Korean Patent Application No. 10-2016-0177430 (4 pages in English, 2 pages in Korean).

Korean Decision of Rejection dated Apr. 11, 2019 in counterpart Korean Patent Application No. 10-2016-0177430 (3 pages in English, 2 pages in Korean).

Korean Notice of Dismissal for Amendment dated Jun. 5, 2019 in counterpart Korean Patent Application No. 10-2016-0177430 (5 pages in Korean, 8 pages in English).

Korean Office Action dated Jul. 18, 2019 in counterpart Korean Patent Application No. 10-2019-0081474 (7 pages in English, 5 pages in Korean).

Korean Office Action dated Dec. 26, 2019 in counterpart Korean Patent Application No. 10-2019-0081474 (8 pages in English, 5 pages in Korean).

Korean Office Action dated Oct. 24, 2022, in counterpart Korean Patent Application No. 10-2022-0108489 (7 pages in English, 4 pages in Korean).

* cited by examiner

OPTICAL IMAGING SYSTEM

CROSS-REFERENCE TO RELATED APPLICATION

This application is a Continuation application of U.S. patent application Ser. No. 16/527,361, now U.S. Pat. No. 10,976,525, filed on Jul. 31, 2019, which is a Continuation of U.S. patent application Ser. No. 15/498,926, now U.S. Pat. No. 10,823,939, filed on Apr. 27, 2017, which claims the benefit under 35 U.S.C. § 119(a) of Korean Patent Application No. 10-2016-0177430, filed on Dec. 23, 2016 in the Korean Intellectual Property Office, the entire disclosure of which is incorporated herein by reference for all purposes.

BACKGROUND

1. Field

The following description relates to a telescopic optical imaging system including five lenses.

2. Description of Related Art

Telescopic optical imaging systems capable of capturing images of distant objects may be significantly large. In detail, in terms of telescopic optical imaging systems, the (TL/f) ratio of the overall length TL of a telescopic optical imaging system to the overall focal length f may be greater than or equal to 1. Thus, it may be difficult to mount telescopic optical imaging systems in small electronic devices, such as portable terminals.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens having a positive refractive power, a second lens having a negative refractive power, a third lens having a negative refractive power, a fourth lens having a negative refractive power, and a fifth lens having a positive refractive power, sequentially disposed from an object side to an imaging plane. One or more lenses among the first to fifth lenses are formed using a glass material.

The first lens of the optical imaging system may have opposing convex surfaces along an optical axis. The second lens of the optical imaging system can have a convex object-side surface along an optical axis and a concave image-side surface along the optical axis. The third lens of the optical imaging system may have opposing concave surfaces along an optical axis. The fourth lens of the optical imaging system can have opposing concave surfaces along an optical axis. The fifth lens of the optical imaging system may have a concave object-side surface along an optical axis and a convex image-side surface along the optical axis.

The refractive index of the first lens of the optical imaging system may be less than or equal to 1.52. The refractive index of the second lens of the optical imaging system can be greater than or equal to 1.7. The refractive index of the third lens of the optical imaging system may be greater than or equal to 1.8. The refractive index of the second lens and a refractive index of the fourth lens can each be lower than the refractive index of the third lens.

In another general aspect, an optical imaging system includes a first lens, a second lens, a third lens, a fourth lens, and a fifth lens, sequentially disposed from an object side to an imaging plane. One or more lenses among the first to fifth lenses are formed using a glass material.

The optical imaging system may satisfy the expression $0.7<TL/f<1.0$, where TL represents a distance from an object-side surface of the first lens to an imaging plane, and f represents an overall focal length of the optical imaging system. The half angle of view of the optical imaging system can be less than or equal to 20°.

The first to third lenses of the optical imaging system may be formed using a glass material. The optical imaging system can satisfy the expression $Nd1<Nd2<Nd3$, where $Nd1$ represents a refractive index of the first lens, $Nd2$ represents a refractive index of the second lens, and $Nd3$ represents a refractive index of the third lens. The refractive index of the second lens and the refractive index of the third lens may each be greater than or equal to 1.7.

In another general aspect, an optical imaging system includes a first lens, a second lens, a third lens, a fourth lens, and a fifth lens. The first to fifth lenses are sequentially disposed from an object side to an imaging plane, wherein at least one of the first to fifth lenses are aspheric and formed using a glass material, wherein the first lens comprises a greatest Abbe number in the optical imaging system, and wherein the third lens comprises a greatest refractive index in the optical imaging system.

The first to third lenses of the optical imaging system may be formed using a glass material. The optical imaging system can satisfy the expression $Nd1<Nd2<Nd3$, where $Nd1$ represents a refractive index of the first lens, $Nd2$ represents a refractive index of the second lens, and $Nd3$ represents a refractive index of the third lens, and wherein the refractive index of the third lens is greater than or equal to 1.8. The Abbe number of the first lens of the optical imaging system may be greater than or equal to 65. Other features and aspects will be apparent from the following detailed description, the drawings, and the claims.

BRIEF DESCRIPTION OF THE DRAWINGS

Throughout the drawings and the detailed description, the same reference numerals refer to the same elements where applicable. The drawings may not be to scale, and the relative size, proportions, and depiction of elements in the drawings may be exaggerated for clarity, illustration, or convenience.

DETAILED DESCRIPTION

Figure 1:
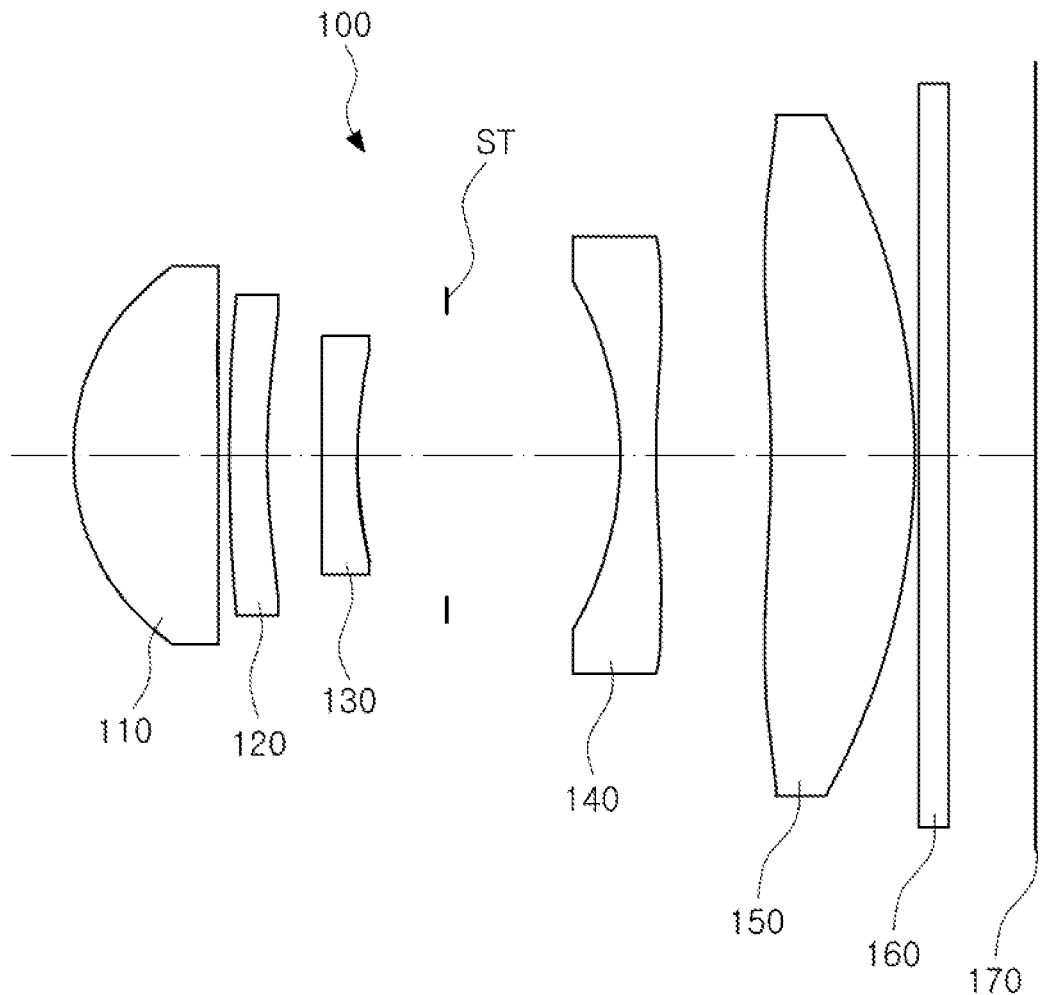
FIG. 1 is a diagram of an optical imaging system according to a first example.

Hereinafter, examples will be described with reference to the attached drawings. Examples provide an optical imaging system capable of capturing images of distant objects, while being mounted in a small terminal.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element, or other elements intervening therebetween may be present. In contrast, when an element is referred to as being "directly on," "directly connected to," or "directly coupled to" another element, there may be no elements or layers intervening therebetween. As used herein, the term "and/or" includes any and all combinations of one or more of the associated listed items.

Although terms such as "first," "second," and "third" may be used herein to describe various components, regions, or sections, these components, regions, or sections are not to be limited by these terms. Rather, these terms are only used to distinguish one component, region, or section from another component, region, or section. Thus, a first component, region, or section referred to in examples described herein may also be referred to as a second component, region, or section without departing from the teachings of the examples.

The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

In the present specification, a first lens refers to a lens closest to an object or a subject of which an image is captured. A fifth lens refers to a lens closest to an imaging plane or an image sensor. In the present specification, an entirety of a radius of curvature, a thickness, a distance from an object-side surface of a first lens to an imaging plane (TL), a half diagonal length of the imaging plane (IMG HT), and a focal length of a lens is indicated in millimeters (mm). A person skilled in the relevant art will appreciate that other units of measurement may be used. Further, in embodiments, all radii of curvature, thicknesses, OALs (optical axis distances from the first surface of the first lens to the image sensor), a distance on the optical axis between the stop and the image sensor (SLs), image heights (IMGHs) (image heights), and back focus lengths (BFLs) of the lenses, an overall focal length of an optical system, and a focal length of each lens are indicated in millimeters (mm). Likewise, thicknesses of lenses, gaps between the lenses, OALs, TLs, SLs are distances measured based on an optical axis of the lenses.

In a description of a form of a lens, a surface of a lens being convex means that an optical axis portion of a corresponding surface is convex, while a surface of a lens being concave means that an optical axis portion of a corresponding surface is concave. Therefore, in a configuration in which a surface of a lens is described as being convex, an edge portion of the lens may be concave. In a manner the same as the case described above, even in a configuration in which a surface of a lens is described as being concave, an edge portion of the lens may be convex. In other words, a paraxial region of a lens may be convex, while the remaining portion of the lens outside the paraxial region is either convex, concave, or flat. Further, a paraxial region of a lens may be concave, while the remaining portion of the lens outside the paraxial region is either convex, concave, or flat. In addition, in an embodiment, thicknesses and radii of curvatures of lenses are measured in relation to optical axes of the corresponding lenses.

In accordance with illustrative examples, the embodiments described of the optical system include five lenses with a refractive power. However, the number of lenses in the optical system may vary in some embodiments, for example, between two to five lenses, while achieving one or more results and benefits described below. Also, although each lens is described with a particular refractive power, a different refractive power for at least one of the lenses may be used to achieve the intended result.

An optical imaging system includes a plurality of lenses. For example, the optical imaging system may include the first lens, a second lens, a third lens, a fourth lens, and a fifth lens, sequentially disposed in a direction from an object side to an imaging plane.

The optical imaging system includes a lens formed using a glass material. However, not all lenses in the optical imaging system are formed using a glass material. For example, a portion of lenses in the optical imaging system are formed using a glass material, while the remainder of lenses are formed using a plastic material.

The first lens has a refractive power. For example, the first lens has a positive refractive power. The first lens has a convex surface. In an embodiment, the first lens has a convex object-side surface.

The first lens has an aspherical surface. For example, both surfaces of the first lens are aspherical. The first lens may be formed using a material having a relatively high degree of light transmittance and excellent workability. As an example, the first lens may be formed using a glass material. However, a material of the first lens is not limited to glass. The first lens has a refractive index. In an embodiment, a refractive index of the first lens is greater than or equal to 1.0 and less than 1.52.

The first lens has a focal length. As an example, a focal length of the first lens is within a range of 2.5 mm to 3.0 mm.

The second lens has a refractive power. For example, the second lens has a negative refractive power. The second lens has a convex surface. In an embodiment, the second lens has a convex object-side surface.

The second lens has an aspherical surface. For example, both surfaces of the second lens are aspherical. The second lens may be formed using a material having a relatively high degree of light transmittance and excellent workability. As an example, the second lens may be formed using a glass material. However, a material of the second lens is not limited to glass. The second lens has a refractive index greater than that of the first lens. In an embodiment, a refractive index of the second lens is greater than or equal to 1.7 and less than 2.0.

The second lens has a focal length. As an example, a focal length of the second lens is within a range of −12.0 mm to −8.0 mm.

The third lens has a refractive power. For example, the third lens has a negative refractive power. The third lens has a concave surface. In an embodiment, the third lens has a concave image-side surface.

The third lens has an aspherical surface. For example, both surfaces of the third lens are aspherical. The third lens may be formed using a material having a relatively high degree of light transmittance and excellent workability. As an example, the third lens is formed using a glass material. However, a material of the third lens is not limited to glass. The third lens has a refractive index greater than that of the second lens. In detail, the refractive index of the third lens is greater than or equal to 1.8 and less than 2.2.

The third lens has a focal length. As an example, a focal length of the third lens is within a range of −0.6 mm to −3.0 mm.

The fourth lens has a refractive power. For example, the fourth lens has a negative refractive power. The fourth lens has a concave surface. In an embodiment, the fourth lens has a concave object-side surface.

The fourth lens has an aspherical surface. For example, both surfaces of the fourth lens are aspherical. The fourth lens may be formed using a material having a relatively high degree of light transmittance and excellent workability. As an example, the fourth lens is formed using a plastic material. However, a material of the fourth lens is not limited to plastic. The fourth lens has a refractive index lower than that of the third lens. In an embodiment, the refractive index of the fourth lens is greater than or equal to 1.0 and less than 1.6.

The fourth lens includes an inflection point. For example, the fourth lens includes one or more inflection points formed on an image-side surface. The fourth lens has a focal length. As an example, a focal length of the fourth lens is within a range of −6.0 mm to −3.0 mm.

The fifth lens has a refractive power. For example, the fifth lens has a positive refractive power. The fifth lens has a convex surface. In an embodiment, the fifth lens has a convex image-side surface.

The fifth lens has an aspherical surface. For example, both surfaces of the fifth lens are aspherical. The fifth lens may be formed using a material having a relatively high degree of light transmittance and excellent workability. As an example, the fifth lens is formed using a plastic material. However, a material of the fifth lens is not limited to plastic. The fifth lens has a refractive index greater than that of the fourth lens. In an embodiment, the refractive index of the fifth lens is greater than or equal to 1.6 and less than 1.7.

The fifth lens has a focal length. As an example, a focal length of the fifth lens is within a range of 30 mm to 60 mm.

Hereinafter, components that do not include a lens will be described. The optical imaging system includes an image sensor. A surface of the image sensor forms an imaging plane. The imaging plane may have a substantially rectangular shape. However, the imaging plane is not limited to having a rectangular shape. For example, the imaging plane is formed in a square shape. Also, the image sensor may be configured to implement high resolution.

The optical imaging system includes a filter. For example, the optical imaging system includes a filter configured to block infrared light. The filter may be formed using a glass material. In an embodiment, the filter is provided as transparent glass on which an infrared cut-off film is formed. A refractive index of the filter may be substantially greater than or equal to 1.5. The filter having the characteristics described above may be interposed between a fifth lens and the image sensor.

The optical imaging system includes a stop configured to adjust an amount of light. In detail, the stop is interposed between a third lens and a fourth lens and adjusts an amount of light incident on the image sensor.

An aspherical surface of a lens in the optical imaging system may be expressed using Formula 1.

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}$$ [Formula 1]

In Formula 1, c represents an inverse of a radius of curvature of a lens, k represents a conic constant, r represents a distance from a certain point on an aspherical surface of the lens to an optical axis, A to J represent aspherical constants, and Z (or SAG) represents a distance between the certain point on the aspherical surface of the lens at the distance r and a tangential plane meeting the apex of the aspherical surface of the lens.

The optical imaging system satisfies the following Conditional Equations:

| | |
|---|---|
| $0.7 < TL/f < 1.0$ | [Conditional Equation 1] |
| $Nd1 < 1.52$ | [Conditional Equation 2] |
| $1.7 < Nd2$ | [Conditional Equation 3] |
| $1.8 < Nd3$ | [Conditional Equation 4] |
| $Nd2 < Nd3, Nd4 < Nd3$ | [Conditional Equation 5] |
| $FOV/2 < 20$ | [Conditional Equation 6] |

In the Conditional Equations, TL represents a distance from the object-side surface of a first lens to an imaging plane, f represents an overall focal length of the optical imaging system, Nd1 represents a refractive index of the first lens, Nd2 represents a refractive index of a second lens, Nd3 represents a refractive index of the third lens, Nd4 represents a refractive index of the fourth lens, and FOV represents an overall angle of view of the optical imaging system.

The optical imaging system having the configuration described above may be mounted in a portable terminal, a small camera, front and rear surveillance cameras of an automobile, a closed-circuit television (CCTV), or the like.

Subsequently, an optical imaging system according to various examples will be described. First, the optical imaging system according to a first example will be described with reference to FIG. 1. An optical imaging system 100, according to the example, includes a first lens 110, a second lens 120, a third lens 130, a fourth lens 140, and a fifth lens 150.

The first lens 110 has a positive refractive power and opposing convex surfaces. The second lens 120 has a negative refractive power, a convex object-side surface, and a concave image-side surface. The third lens 130 has a negative refractive power and opposing concave surfaces. The fourth lens 140 has a negative refractive power and opposing concave surfaces. The fifth lens 150 has a positive refractive power, a concave object-side surface, and a convex image-side surface.

First lens 110 has a relatively low refractive index. For example, the refractive index of first lens 110 is less than or equal to 1.52. Second lens 120 and third lens 130 have a relatively high refractive index. For example, the refractive index of second lens 120 is greater than or equal to 1.7, while the refractive index of third lens 130 is greater than or equal to 1.8. Fourth lens 140 and fifth lens 150 have a refractive index lower than that of third lens 130. For example, the refractive index of fourth lens 140 is less than or equal to 1.6, while the refractive index of fifth lens 150 is less than or equal to 1.7.

First lens 110 has the highest Abbe number in optical imaging system 100. For example, an Abbe number of first lens 110 is greater than or equal to 65. Second lens 120 and third lens 130 have a relatively low Abbe number. For example, Abbe numbers of second lens 120 and third lens 130 are less than or equal to 30. Fourth lens 140 has a relatively high Abbe number. For example, an Abbe number of fourth lens 140 is greater than or equal to 50. Fifth lens 150 has the lowest Abbe number in the optical imaging system. For example, an Abbe number of fifth lens 150 is less than or equal to 25.

Each lens of optical imaging system 100 has a focal length. For example, a focal length of first lens 110 is 2.705 mm, a focal length of second lens 120 is −10.13 mm, a focal length of third lens 130 is −4.349 mm, a focal length of fourth lens 140 is −4.337 mm, and a focal length of fifth lens 150 is 37.285 mm.

Optical imaging system 100 is configured to include lenses formed using different materials. For example, first lens 110, second lens 120, and third lens 130 are formed using a glass material, while fourth lens 140 and fifth lens 150 are formed using a plastic material.

Optical imaging system 100 further includes a filter 160, an image sensor 170, and a stop ST. Filter 160 is interposed between fifth lens 150 and image sensor 170, while stop ST is interposed between third lens 130 and fourth lens 140.

Figure 2:
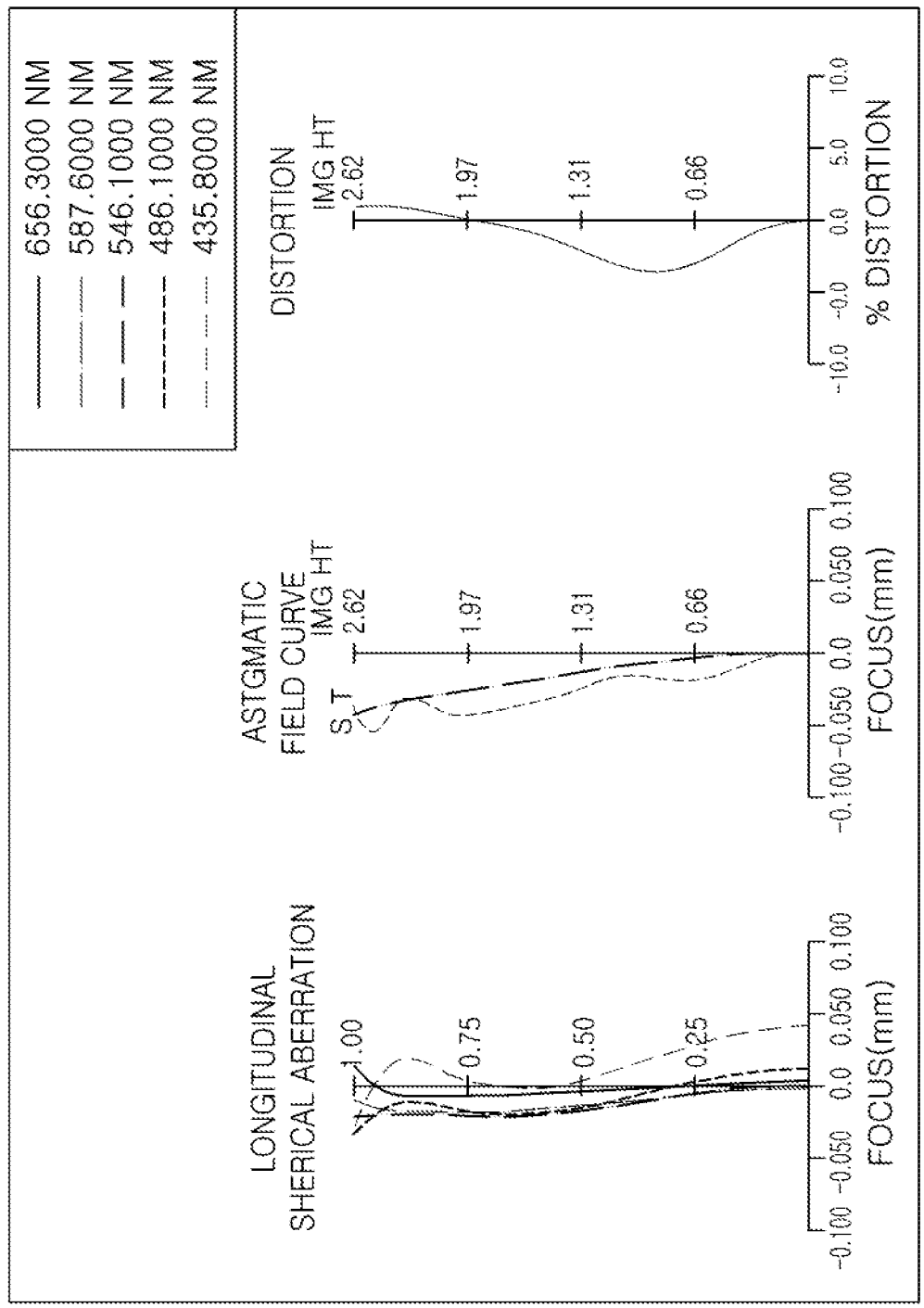
FIG. 2 is a set of graphs illustrating aberration curves of the optical imaging system illustrated in FIG. 1.
Figure 3:
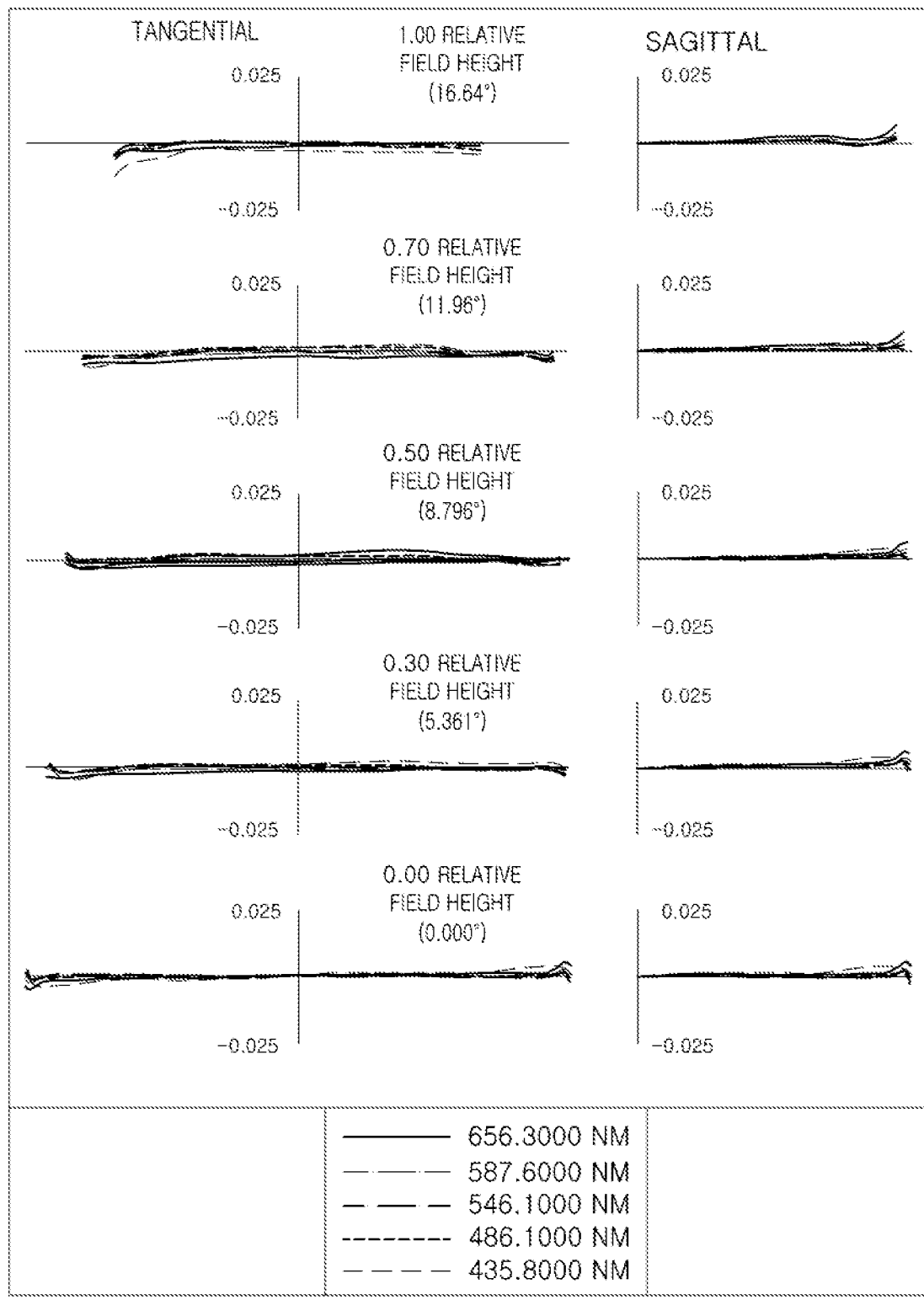
FIG. 3 is a set of graphs illustrating transverse curves of the optical imaging system illustrated in FIG. 1.

An optical imaging system having the configuration described above has aberration characteristics as illustrated by the graphs in FIGS. 2 and 3. Table 1 lists lens characteristics of optical imaging system 100 according to the example, while Table 2 lists aspherical characteristics of the optical imaging system according to the example.

TABLE 1

First Example
FOV/2 = 16.64
f = 8.700
TL = 6.40

| Surface No. | | Radius of Curvature | Thickness/ Distanc | Effective Radius | Refractive Index | Abbe Number |
|---|---|---|---|---|---|---|
| S1 | First | 1.5077 | 0.9590 | 1.250 | 1.512 | 68.0 |
| S2 | Lens | −13.34 | 0.0810 | 1.130 | | |
| S3 | Second | 21.271 | 0.2510 | 1.060 | 1.755 | 27.5 |
| S4 | Lens | 5.5959 | 0.3890 | 0.950 | | |
| S5 | Third | −11.950 | 0.2400 | 0.780 | 2.001 | 29.1 |
| S6 | Lens | 6.9163 | 1.7490 | 0.710 | | |
| S7 | Fourth | −3.9238 | 0.2400 | 1.150 | 1.544 | 56.0 |
| S8 | Lens | 6.0470 | 0.7650 | 1.460 | | |
| S9 | Fifth | −21.5714 | 0.9540 | 2.140 | 1.632 | 23.4 |
| S10 | Lens | −11.4547 | 0.0220 | 2.260 | | |
| S11 | Filter | infinity | 0.2100 | 2.430 | | |
| S12 | | infinity | 0.5830 | 2.620 | | |
| S13 | Imaging Plane | infinity | 0.0000 | | | |

TABLE 2

| | S1 | S2 | S3 | S4 | S5 | S6 | S7 | S8 | S9 | S10 |
|---|---|---|---|---|---|---|---|---|---|---|
| K | −0.3224 | −99.000 | 44.5110 | −5.5906 | −11.950 | 6.9163 | −3.9238 | 0.0000 | 80.6084 | 0.0000 |
| A | 0.0088 | 0.0940 | 0.0463 | −0.0147 | 0.0000 | 0.0000 | −0.8393 | −0.1306 | −0.1440 | −0.2220 |
| B | 0.0119 | −0.0323 | 0.1270 | 0.3100 | 0.1554 | 0.2079 | −0.1012 | 0.3487 | 0.2618 | 0.2118 |
| C | −0.0381 | −0.2165 | −1.0053 | −2.0972 | −0.0041 | 0.0050 | 0.0774 | −0.7032 | −0.2153 | −0.1042 |
| D | 0.0955 | 0.4920 | 2.8585 | 7.9100 | −0.8329 | −0.7424 | −0.0634 | 0.8513 | 0.1064 | 0.0317 |
| E | −0.1276 | −0.5535 | −4.9445 | −18.653 | 3.7058 | 4.3623 | −0.4282 | −0.6482 | −0.0338 | −0.0070 |
| F | 0.0957 | 0.3612 | 5.4629 | 27.4949 | −10.102 | −14.753 | 1.3727 | 0.3133 | 0.0070 | 0.0013 |
| G | −0.0376 | −0.1290 | −3.7103 | −24.485 | 14.8725 | 24.5575 | −1.8594 | −0.0932 | −0.0009 | −0.0002 |
| H | 0.0059 | 0.0198 | 1.4098 | 12.0503 | −8.6473 | −10.810 | 1.3365 | 0.0155 | 0.0001 | 0.0000 |

Figure 4:
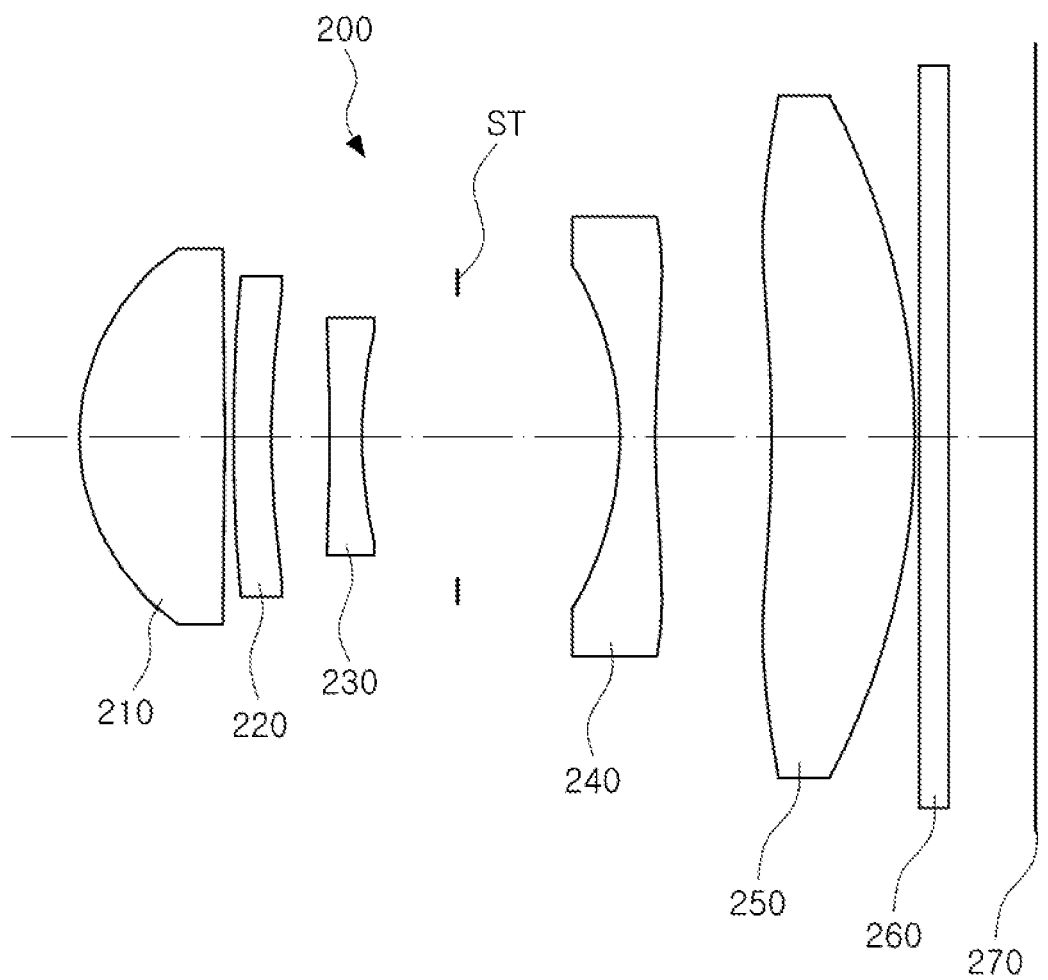
FIG. 4 is a diagram of an optical imaging system according to a second example.

An optical imaging system according to a second example will be described with reference to FIG. 4. An optical imaging system 200, according to the example, includes a first lens 210, a second lens 220, a third lens 230, a fourth lens 240, and a fifth lens 250.

The first lens 210 has a positive refractive power and opposing convex surfaces. The second lens 220 has a negative refractive power, a convex object-side surface, and a concave image-side surface. The third lens 230 has a negative refractive power and opposing concave surfaces. The fourth lens 240 has a negative refractive power and opposing concave surfaces. The fifth lens 250 has a positive refractive power, a concave object-side surface, and a convex image-side surface.

First lens 210 has a relatively low refractive index. For example, the refractive index of first lens 210 is less than or equal to 1.52. Second lens 220 and third lens 230 have relatively high refractive indices. For example, the refractive index of second lens 220 is greater than or equal to 1.7, while the refractive index of third lens 230 is greater than or equal to 1.8. Fourth lens 240 and fifth lens 250 have refractive indices lower than that of third lens 230. For example, a refractive index of fourth lens 240 is less than or equal to 1.6, while a refractive index of fifth lens 250 is less than or equal to 1.7.

First lens 210 has the highest Abbe number in optical imaging system 200. For example, an Abbe number of first lens 210 is greater than or equal to 65. Second lens 220 and third lens 230 have substantially relatively low Abbe numbers. For example, Abbe numbers of second lens 220 and third lens 230 are less than or equal to 30. Fourth lens 240 has a relatively high Abbe number. For example, an Abbe number of fourth lens 240 is greater than or equal to 50. Fifth lens 250 has the lowest Abbe number in the optical imaging system. For example, an Abbe number of fifth lens 250 is less than or equal to 25.

Each lens of optical imaging system 200 has a focal length. For example, a focal length of first lens 210 is 2.675 mm, a focal length of second lens 220 is −10.53 mm, a focal length of third lens 230 is −4.382 mm, a focal length of fourth lens 240 is −4.287 mm, and a focal length of fifth lens 250 is 51.752 mm.

Optical imaging system 200 is configured to include lenses formed using different materials. For example, first lens 210, second lens 220, and third lens 230 are formed using a glass material, while fourth lens 240 and fifth lens 250 are formed using a plastic material.

Optical imaging system 200 further includes a filter 260, an image sensor 270, and a stop ST. Filter 260 is interposed between fifth lens 250 and image sensor 270, while stop ST is interposed between third lens 230 and fourth lens 240.

Figure 5:
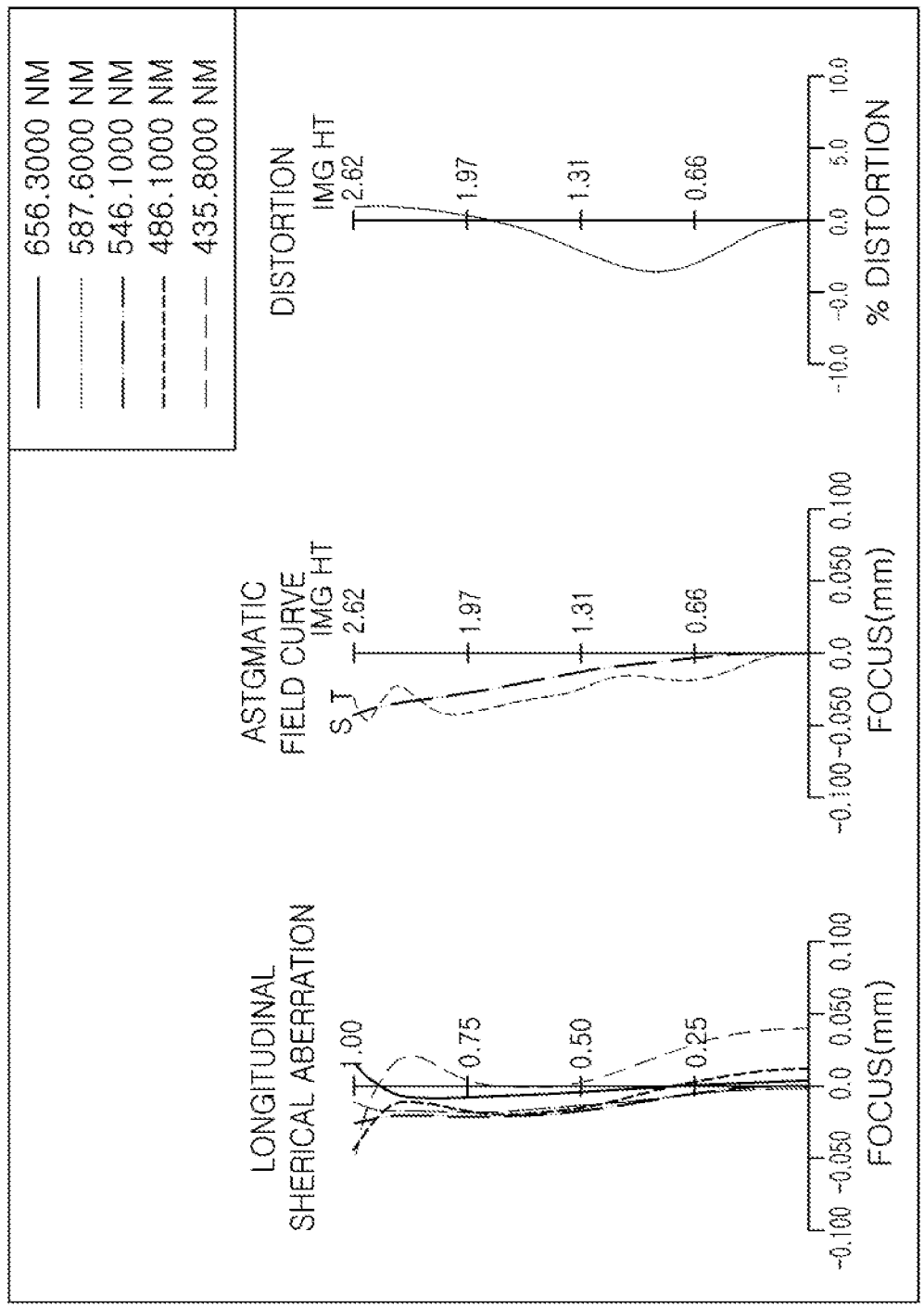
FIG. 5 is a set of graphs illustrating aberration curves of the optical imaging system illustrated in FIG. 4.
Figure 6:
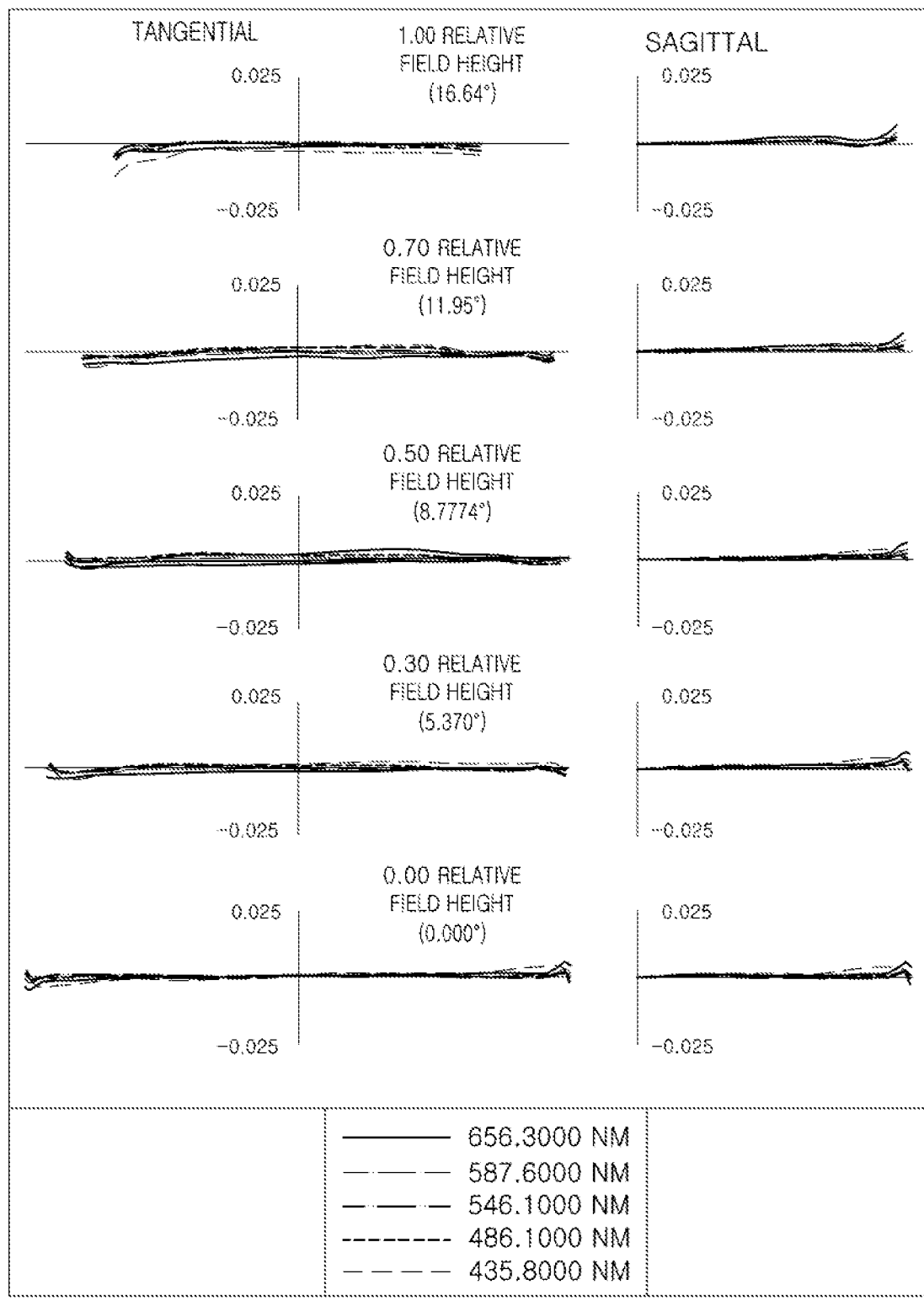
FIG. 6 is a set of graphs illustrating transverse curves of the optical imaging system illustrated in FIG. 4.

An optical imaging system having the configuration described above has aberration characteristics as illustrated by the graphs in FIGS. 5 and 6. Table 3 lists lens characteristics of optical imaging system 200 according to the example, while Table 4 lists aspherical characteristics of optical imaging system 200 according to the example.

TABLE 3

Second Example
FOV/2 = 16.64
f = 8.700
TL = 6.38

| Surface No. | | Radius of Curvature | Thickness/ Distance | Effective Radius | Refractive Index | Abbe Number |
|---|---|---|---|---|---|---|
| S1 | First | 1.4890 | 0.9430 | 1.250 | 1.512 | 68.0 |
| S2 | Lens | −13.41 | 0.0830 | 1.140 | | |
| S3 | Second | 25.089 | 0.2530 | 1.070 | 1.755 | 27.5 |
| S4 | Lens | 6.0111 | 0.3670 | 0.960 | | |
| S5 | Third | −11.411 | 0.2400 | 0.790 | 2.001 | 29.1 |
| S6 | Lens | 7.2003 | 1.7220 | 0.710 | | |
| S7 | Fourth | −3.7601 | 0.2400 | 1.150 | 1.544 | 56.0 |
| S8 | Lens | 6.2812 | 0.7690 | 1.460 | | |
| S9 | Fifth | −21.2400 | 0.9620 | 2.150 | 1.632 | 23.4 |
| S10 | Lens | −13.1033 | 0.0220 | 2.270 | | |
| S11 | Filter | infinity | 0.2100 | 2.430 | | |
| S12 | | infinity | 0.5830 | 2.620 | | |
| S13 | Imaging Plane | infinity | 0.0000 | | | |

TABLE 4

| | S1 | S2 | S3 | S4 | S5 | S6 | S7 | S8 | S9 | S10 |
|---|---|---|---|---|---|---|---|---|---|---|
| K | −0.3167 | −99.000 | 41.1599 | −4.9040 | 0.0000 | 0.0000 | −2.5685 | 0.0000 | 80.6084 | 0.0000 |
| A | 0.0092 | 0.0947 | 0.0462 | −0.0143 | 0.1640 | 0.2180 | −0.0971 | −0.1325 | −0.1573 | −0.2353 |
| B | 0.0121 | −0.0320 | 0.1270 | 0.3100 | −0.0376 | −0.0671 | 0.0588 | 0.3918 | 0.2830 | 0.2234 |
| C | −0.0379 | −0.2164 | −1.0049 | −2.0968 | −0.7096 | −0.1163 | 0.1282 | 0.7840 | −0.2329 | −0.1082 |
| D | 0.0956 | 0.4920 | 2.8589 | 7.9100 | 3.4579 | 0.4098 | −1.1242 | 0.9315 | 0.1153 | 0.0311 |
| E | −0.1276 | −0.5534 | −4.9444 | −18.652 | −10.400 | 1.5895 | 2.6982 | −0.6963 | −0.0365 | −0.0060 |
| F | 0.0957 | 0.3612 | 5.4629 | 27.4952 | 17.5614 | −19.213 | −3.3562 | 0.3303 | 0.0074 | 0.0009 |
| G | −0.0376 | −0.1290 | −3.7103 | −24.486 | −14.472 | 61.9052 | 2.3381 | −0.0962 | −0.0009 | −0.0001 |
| H | 0.0059 | 0.0198 | 1.4098 | 12.0503 | 3.0496 | −86.068 | −0.8616 | 0.0157 | 0.0001 | 0.0000 |

Figure 7:
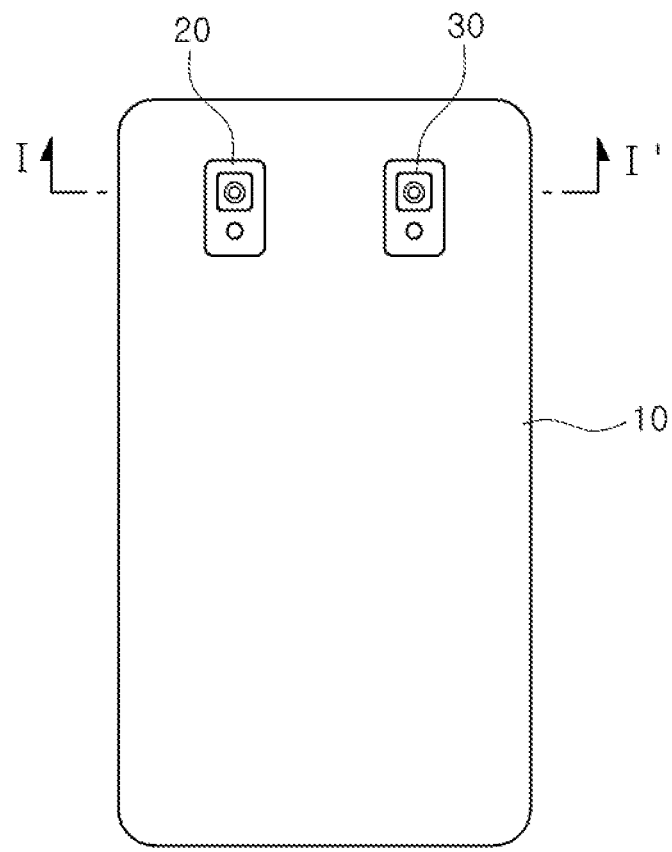
FIG. 7 is a rear view of a portable terminal including an optical imaging system mounted therein according to an example.
Figure 8:
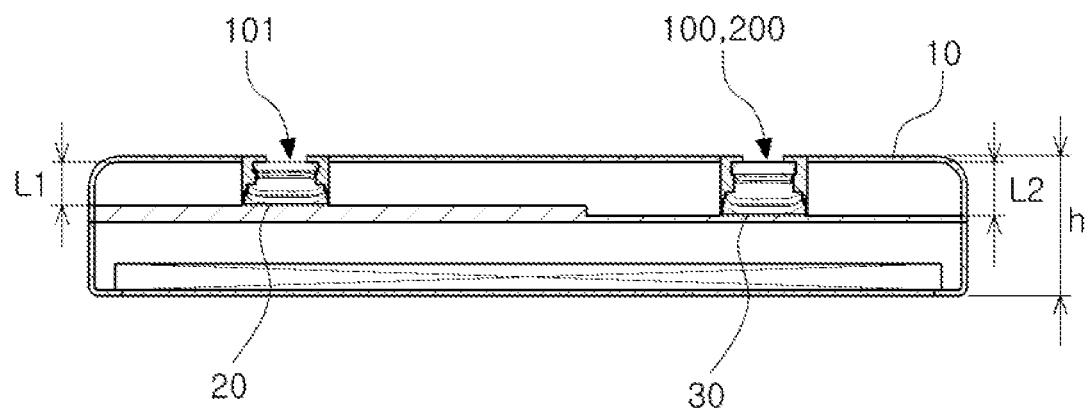
FIG. 8 is a cross-sectional view of the portable terminal illustrated in FIG. 7.

Hereinafter, a portable terminal including an optical imaging system mounted therein, according to an example, will be described with reference to FIGS. 7 and 8. A portable terminal 10 includes a plurality of camera modules 20 and 30. A first camera module 20 includes a first optical imaging system 101, configured to capture an image of a subject at a short distance. A second camera module 30 includes second optical imaging systems 100 and 200, configured to capture an image of a distant subject.

First optical imaging system 101 includes a plurality of lenses. For example, first optical imaging system 101 includes four or more lenses. First optical imaging system 101 is configured to capture images of objects at a short distance. In detail, first optical imaging system 101 may have a relatively wide angle of view of 50° or more, while a (TL/f) ratio is greater than or equal to 1.0.

Second optical imaging systems 100 and 200 include a plurality of lenses. For example, second optical imaging systems 100 and 200 may include five lenses. Second optical imaging systems 100 and 200 may be provided as one optical imaging system among optical imaging systems, as in the first and second examples described above. Second optical imaging systems 100 and 200 may be configured to capture an image of a distant object. In detail, second optical imaging systems 100 and 200 have an angle of view of 40° or less, while a (TL/f) ratio is less than 1.0.

First optical imaging system 101 and second optical imaging systems 100 and 200 may be substantially equal in size. In detail, an overall length L1 of first optical imaging system 101 is substantially the same as an overall length L2 of second optical imaging systems 100 and 200. Alternatively, a ratio (L1/L2) of the overall length L1 of first optical imaging system 101 to the overall length L2 of second optical imaging systems 100 and 200 may be from 0.8 to 1.0. In embodiments, a ratio (L2/h) of the overall length L2 of second optical imaging systems 100 and 200 to a thickness h of portable terminal 10 may be less than or equal to 0.8.

As set forth above, according to examples, an optical imaging system capable of capturing a distant image and being mounted in a small terminal may be provided. While this disclosure includes specific examples, it will be apparent after an understanding of this disclosure that various changes in form and details may be made in these examples without departing from the spirit and scope of the claims and their equivalents. The examples described herein are to be considered in a descriptive sense only, and not for purposes of limitation.

Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:
a first lens comprising a positive refractive power;
a second lens comprising a negative refractive power;
a third lens comprising a negative refractive power;
a fourth lens comprising a negative refractive power and a concave object-side surface in a paraxial region; and
a fifth lens comprising a positive refractive power,
wherein the first to fifth lenses are sequentially disposed from an object side to an imaging plane,
wherein one or more lenses among the first to fifth lenses are formed using a glass material,
wherein a thickness along an optical axis of the second lens is greater than a thickness along an optical axis of the third lens,
wherein a radius of curvature of an object-side surface of the second lens is greater than a radius of curvature of an image-side surface of the first lens and a radius of curvature of an image-side surface of the third lens, and
wherein a radius of curvature of an image-side surface of the fourth lens is greater than a radius of curvature of an object-side surface of the fourth lens.

2. The optical imaging system of claim 1, wherein the first lens has opposing convex surfaces along an optical axis.

3. The optical imaging system of claim 1, wherein the second lens has a convex object-side surface along an optical axis and a concave image-side surface along the optical axis.

4. The optical imaging system of claim 1, wherein the third lens has opposing concave surfaces along an optical axis.

5. The optical imaging system of claim 1, wherein the fourth lens has opposing concave surfaces along an optical axis.

6. The optical imaging system of claim 1, wherein the fifth lens has a concave object-side surface along an optical axis and a convex image-side surface along the optical axis.

7. The optical imaging system of claim 1, wherein a refractive index of the first lens is less than or equal to 1.52.

8. The optical imaging system of claim 1, wherein a refractive index of the second lens is greater than or equal to 1.7.

9. The optical imaging system of claim 1, wherein a refractive index of the third lens is greater than or equal to 1.8.

10. The optical imaging system of claim 1, wherein the refractive index of the second lens and a refractive index of the fourth lens are each lower than the refractive index of the third lens.

11. An optical imaging system, comprising:
a first lens having a refractive power, a second lens having a refractive power, a third lens having a refractive power, a fourth lens having a concave object-side surface in a paraxial region, and a fifth lens having a refractive power, sequentially disposed from an object side to an imaging plane,
wherein a thickness along an optical axis of the second lens is greater than a thickness along an optical axis of the third lens,
wherein a radius of curvature of an object-side surface of the second lens is greater than a radius of curvature of an image-side surface of the first lens and a radius of curvature of an image-side surface of the third lens,
wherein a radius of curvature of an image-side surface of the fourth lens is greater than a radius of curvature of an object-side surface of the fourth lens, and
wherein a radius of curvature of an image-side surface of the fifth lens is less than the radius of curvature of the image-side surface of the first lens or the radius of curvature of the object-side surface of the fourth lens.

12. The optical imaging system of claim 11, wherein the optical imaging system satisfies the following expression:

$$0.7 < TL/f < 1.0,$$

where TL represents a distance from an object-side surface of the first lens to an imaging plane, and f represents an overall focal length of the optical imaging system.

13. The optical imaging system of claim 11, wherein a half angle of view is less than or equal to 20°.

14. The optical imaging system of claim 11, wherein the first to third lenses are formed using a glass material.

15. The optical imaging system of claim 11, wherein the optical imaging system satisfies the following expression:

$$Nd1 < Nd2 < Nd3,$$

where Nd1 represents a refractive index of the first lens, Nd2 represents a refractive index of the second lens, and Nd3 represents a refractive index of the third lens.

16. The optical imaging system of claim 11, wherein the refractive index of the second lens and the refractive index of the third lens are each greater than or equal to 1.7.

17. An optical imaging system, comprising:
a first lens, a second lens, a third lens, a fourth lens having a concave object-side surface in a paraxial region, and a fifth lens having a convex image-side surface in a paraxial region,
wherein the first to fifth lenses are sequentially disposed from an object side to an imaging plane,
wherein at least one of the first to fifth lenses are aspheric and formed using a glass material,
wherein the first lens comprises a greatest Abbe number in the optical imaging system,
wherein the third lens comprises a greatest refractive index in the optical imaging system,
wherein a thickness along an optical axis of the second lens is greater than a thickness along an optical axis of the third lens,
wherein a radius of curvature of an object-side surface of the second lens is greater than a radius of curvature of an image-side surface of the first lens and a radius of curvature of an image-side surface of the third lens, and
wherein a radius of curvature of an image-side surface of the fourth lens is greater than a radius of curvature of an object-side surface of the fourth lens.

18. The optical imaging system of claim 17, wherein the first to third lenses are formed using a glass material.

19. The optical imaging system of claim 17, wherein the optical imaging system satisfies the expression:

$$Nd1 < Nd2 < Nd3$$

where Nd1 represents a refractive index of the first lens, Nd2 represents a refractive index of the second lens, and Nd3 represents a refractive index of the third lens, and
wherein the refractive index of the third lens is greater than or equal to 1.8.

20. The optical imaging system of claim 17, wherein the Abbe number of the first lens is greater than or equal to 65.

* * * * *